Sept. 2, 1941.  G. C. BRUEN  2,254,728
INTERTRAY SHIFTING FOR VISIBLE INDEX SYSTEMS
Filed Dec. 16, 1937  4 Sheets-Sheet 1
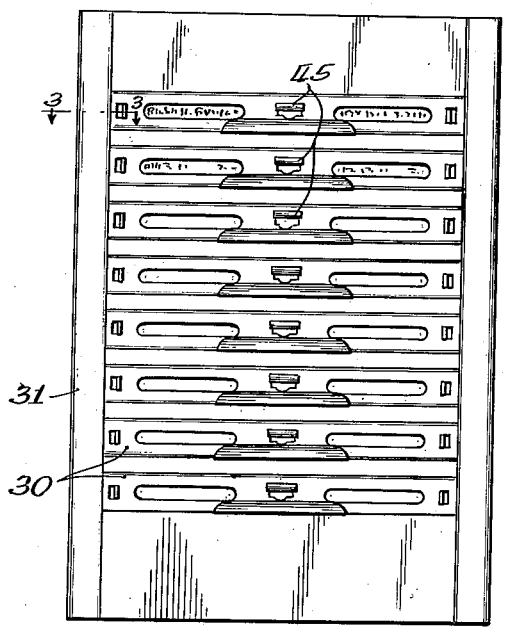
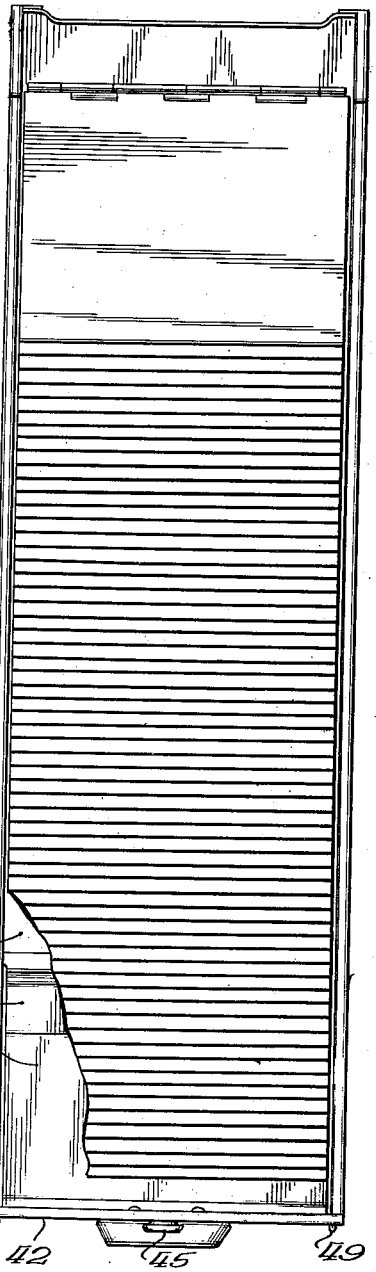
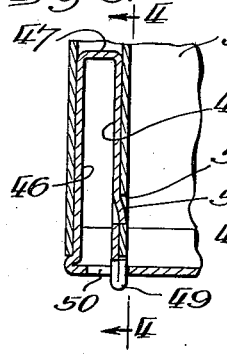
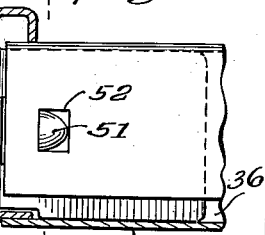
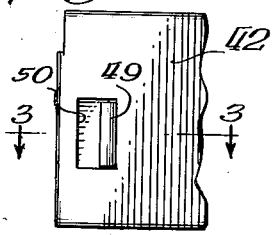
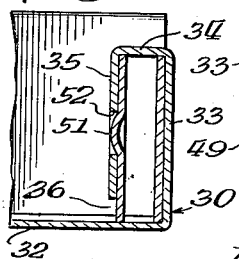
Inventor:
George C. Bruen
By Williams, Bradbury, McCaleb & Hinkle
Attys.

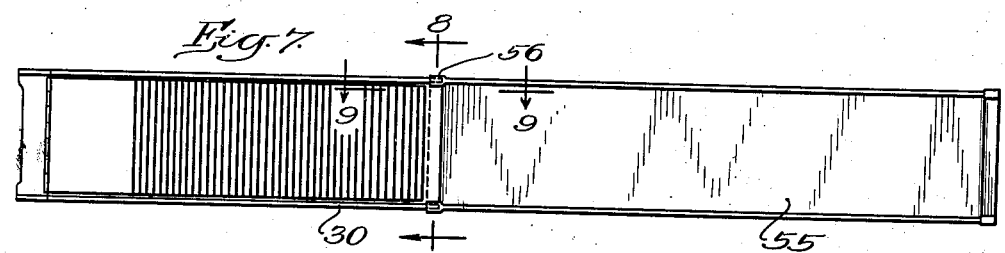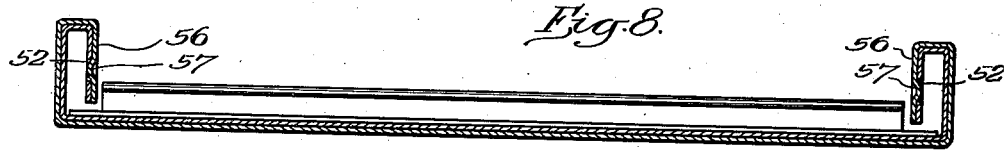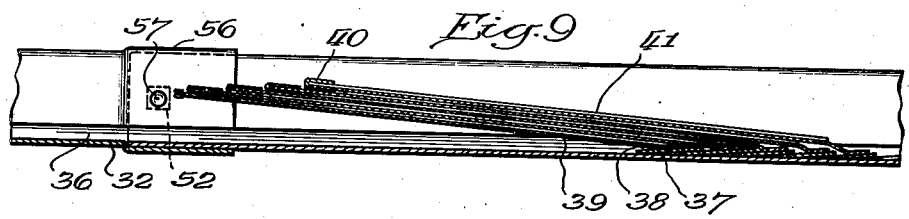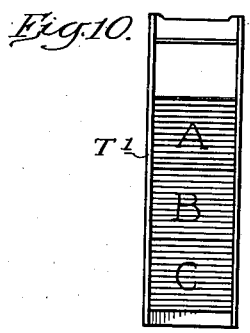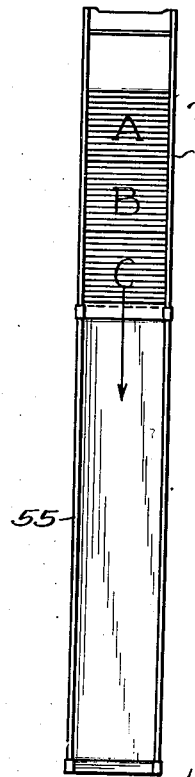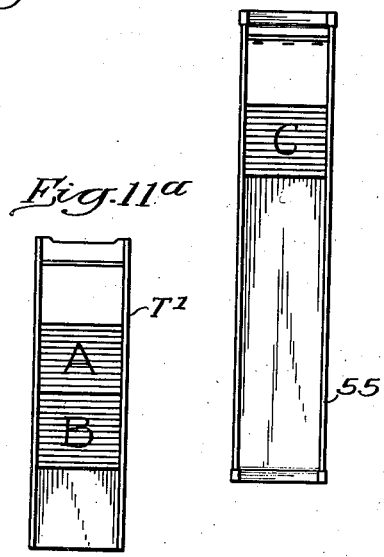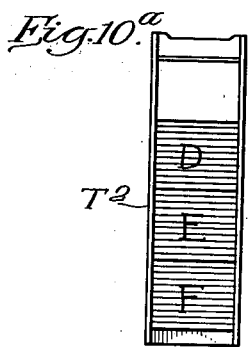

Sept. 2, 1941.     G. C. BRUEN     2,254,728
INTERTRAY SHIFTING FOR VISIBLE INDEX SYSTEMS
Filed Dec. 16, 1937     4 Sheets-Sheet 3
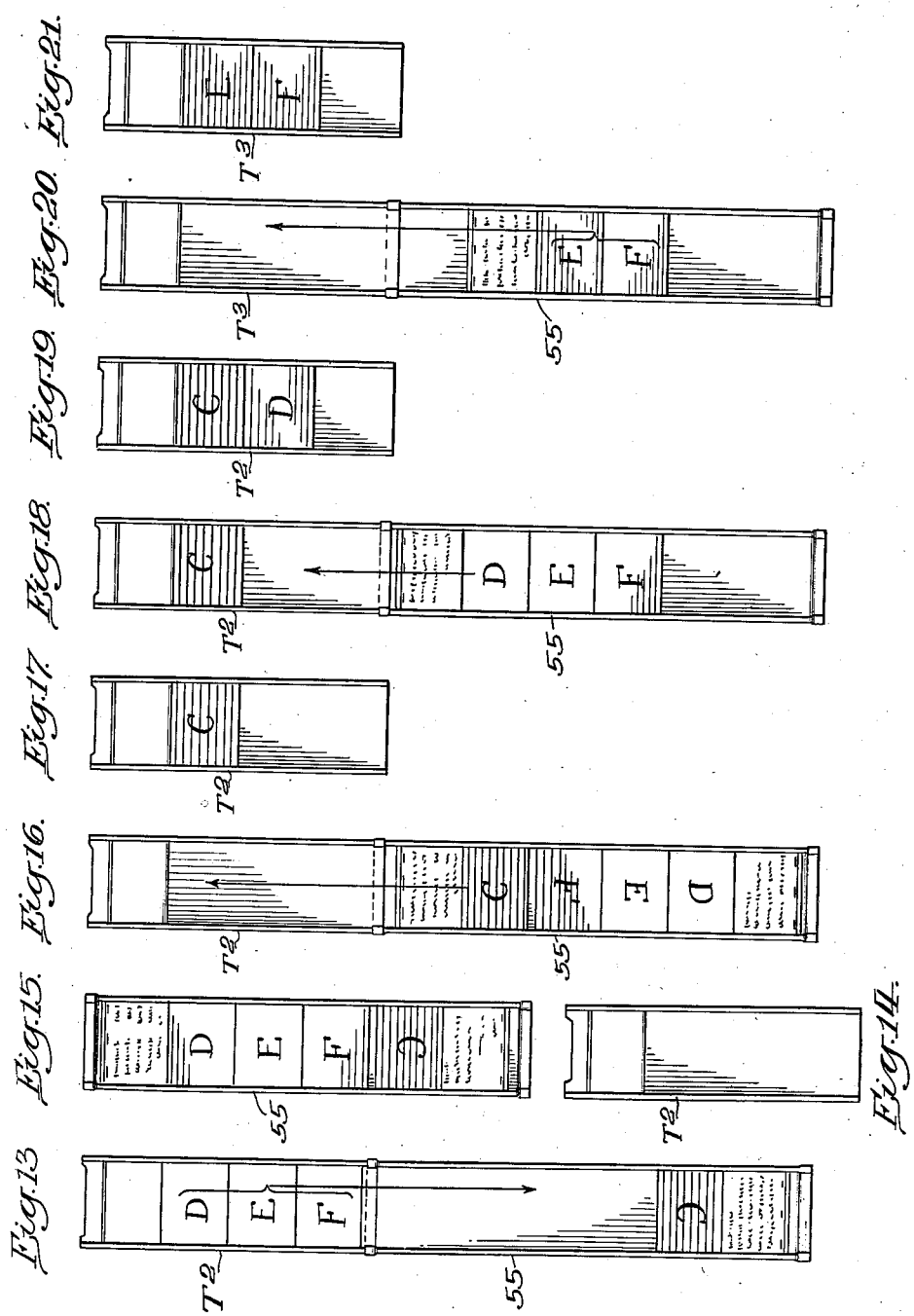
Inventor
George C. Bruen
By
Williams, Bradbury, McCaleb & Hinkle
Attys.

Sept. 2, 1941.           G. C. BRUEN           2,254,728
INTERTRAY SHIFTING FOR VISIBLE INDEX SYSTEMS
Filed Dec. 16, 1937        4 Sheets-Sheet 4
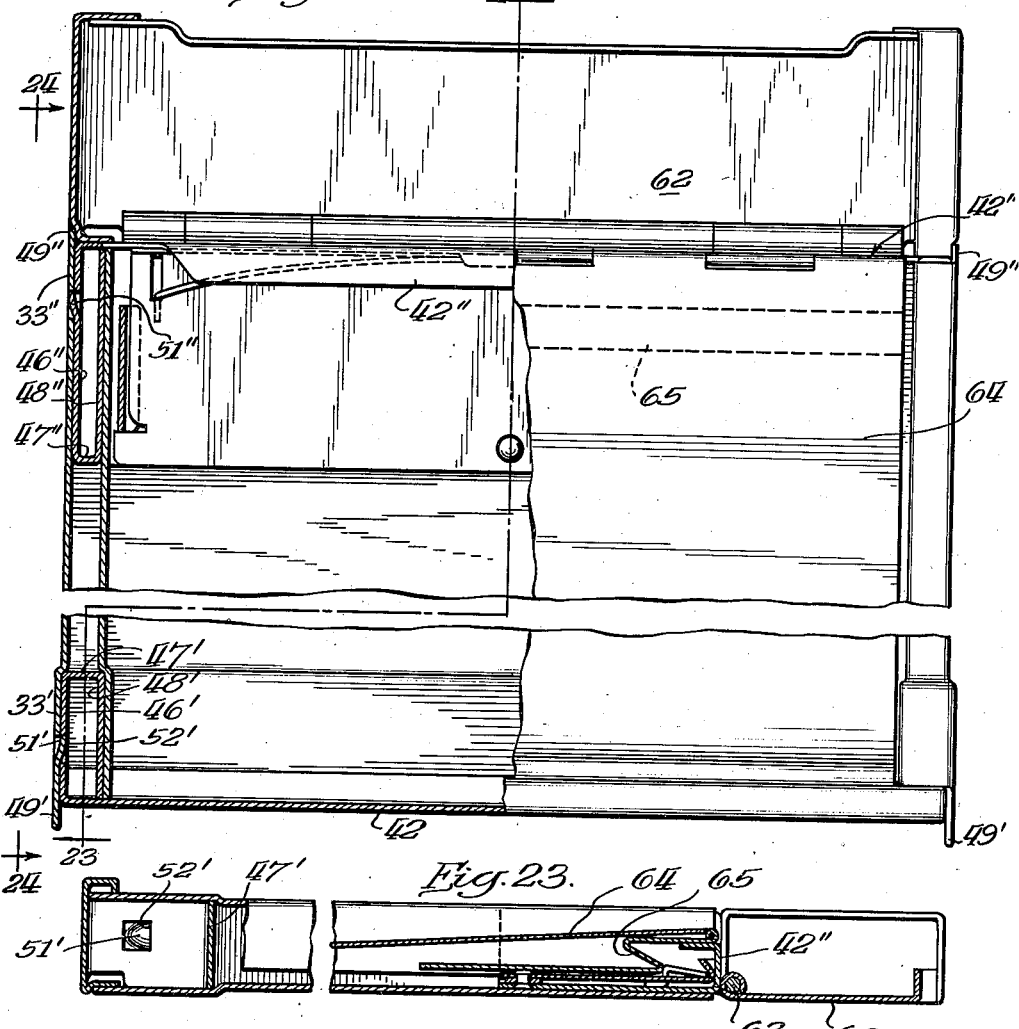
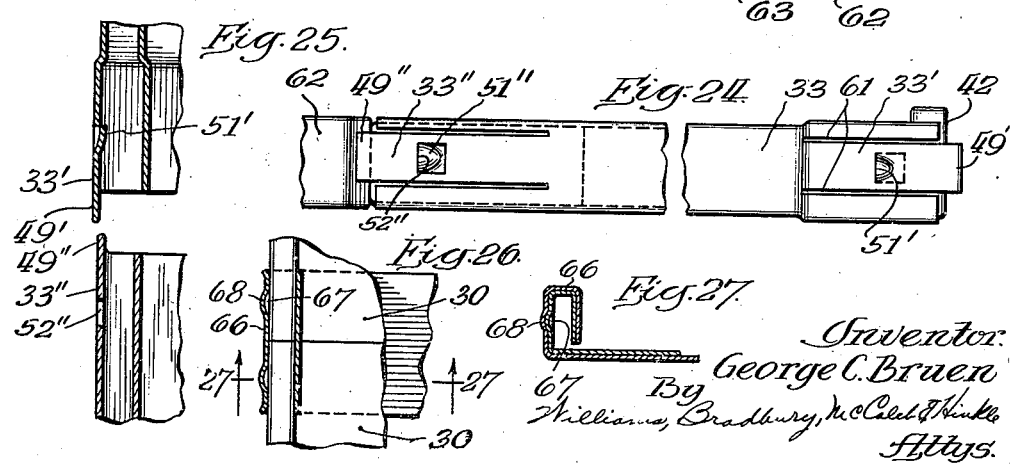

Patented Sept. 2, 1941

2,254,728

UNITED STATES PATENT OFFICE 2,254,728

INTERTRAY SHIFTING FOR VISIBLE INDEX SYSTEMS

George C. Bruen, Chicago, Ill., assignor to Rotary Index Co., Inc., Chicago, Ill., a corporation of Illinois Application December 16, 1937, Serial No. 180,197

3 Claims. (Cl. 129—16)

My invention relates to inter-tray shifting for visible index systems.

In the so-called visible index systems, record bearing cards are hingedly carried by card carriers, whereby the cards are normally in overlapping relationship with their margins exposed. The card carriers are mounted in a tray with their ends carried in inwardly facing guide ways along the lateral edges of the tray, so that the carriers with their cards may be slid longitudinally of the tray. The carriers also serve to space the cards as required to expose a definite margin.

It frequently becomes necessary to rearrange the cards, add new ones, or remove old ones. In order to preserve alphabetical or numerical order, the card carriers have to be shifted within the trays or the cards shifted as between carriers. It has been the practice to provide blank carriers or blank cards to provide for limited additional expansion within each tray, but this has necessarily reduced the working capacity of each tray to the extent that blank cards or carriers were held in reserve. When the number of cards to be added exceeded the reserve blank capacity provided, cards either with or without their carriers have had to be transferred to adjoining trays in the set of trays. This has been a laborious procedure because either the cards or the cards and their carriers have had to be removed more or less individually from one tray and put into the next tray. Generally, that shifting of cards or carriers would require that some cards or carriers be shifted from the next tray on to still another tray, and so on through several trays until enough cards and carriers were accumulated by shifting to justify the permanent addition of another working tray.

The principal object of my invention is to facilitate this inter-tray shifting or transfer of cards.

In general my main objective may be realized in either of two ways. One is by making it possible to shift carriers with their cards directly from one working tray to another working tray. The other way is by shifting cards from one working tray to an auxiliary or special shifting tray, and from the latter in turn directly to another working tray.

A subordinate object of my invention is the provision of means for removably holding one or both ends of a tray in such a manner that the end with its associated parts may readily be removed to free the way for sliding of carriers endwise on to or from the tray.

Another object is the provision of means for holding the juxtaposed ends of aligned trays in register so that carriers may be slid directly from one tray to another.

The foregoing together with further objects, features and advantages of my invention are set forth in the following description of specific embodiments thereof and illustrated in the accompanying drawings wherein:

Fig. 1 is a front view of a conventional visible index cabinet containing a series of visible index trays modified to incorporate my invention;

Fig. 2 is a plan view of one of the trays of Fig. 1;

Fig. 3 is a fragmentary plan section of the left front corner of the tray of Fig. 2 showing the means for removably locking the tray front to the tray body and may be considered as taken on the line 3—3 of Figs. 1 and 5;

Fig. 4 is a vertical section taken on the line 4—4 of Fig. 3;

Fig. 5 is an enlarged detail elevation of the left end of the front of the tray;

Fig. 6 is a transverse vertical section looking forwardly of the tray taken on the line 6—6 of Fig. 4;

Fig. 7 is a plan view of the tray of Fig. 2 coupled to a special shifting tray;

Fig. 8 is a transverse section taken on the line 8—8 of Fig. 7;

Fig. 9 is a fragmentary longitudinal vertical section taken on the lines 9—9 of Fig. 7;

Figs. 10 to 21, inclusive, are somewhat diagrammatical plan views of regular or working trays and the special shifting tray showing the various steps in effecting a given transfer of carriers and cards between trays;

Fig. 22 is a plan view, partly broken into plan section, of a tray similar to that of Fig. 2, but modified to include a releasable lock for the rear end and a modified form of lock for the front end;

Fig. 23 is a longitudinal vertical section taken on the line 23—23 of Fig. 22;

Fig. 24 is a side elevation of the tray of Fig. 22 which may be considered as taken on the line 24—24 of Fig. 22;

Fig. 25 is a plan section of the front left corner of the tray of Fig. 22, from which the front has been removed, and of the rear left corner of another tray like that of Fig. 22 from which the rear end has been removed, the figure illustrating the ends just before they are brought into telescoping relationship;

Fig. 26 is a fragmentary plan section of the juxtaposed ends of two trays showing a coupling sleeve for holding them in register; and Fig. 27 is a transverse vertical section taken on the line 27—27 of Fig. 26.

My invention is here disclosed as embodied in the specific type of visible index where the card holders include hinged leaf portions which in turn hold the cards with the overlapping margins of the cards exposed through transparent sheaths and where the trays constitute drawers normally stored in a common cabinet. However, my invention may be incorporated in other types of visible index systems.

A plurality of trays 30 are arranged as drawers in a common cabinet 31, as shown in Fig. 1. The body of each tray may be formed from a single piece of sheet metal bent up to provide a bottom 32 at each lateral margin extending upwardly as an outside vertical wall 33, inwardly as a narrow top wall 34, and downwardly as a return bent inner wall 35 which terminates a spaced distance above the bottom 32 leaving, in effect, an inwardly opening channel or way 36.

A multiplicity of card holders or carriers 37 are carried within each tray (see Fig. 9). Each card holder consists of a base strip 38 and a leaf 39 hingedly carried by the base strip. The outer margin of each leaf 39 carries a transparent sheath 40 of Celluloid forming a pocket into which is inserted the marginal edge of a record bearing card 41 borne by the carrier. In the specific type of card holder here shown, the base strips 37 internest so that the base strips space the carriers apart by approximately half the width of the base strips. In other types of visible index systems in common use, and especially where the card is hinged directly to the carrier without the use of a carrier leaf, the carrier strips do not internest and the carrier strips space the card carriers and their cards by the width of the strips. My invention is not especially concerned with which types of carriers are used.

The cards or the leaves of the carriers, as the case may be, are preferably but slightly narrower than the distance between the inside walls 35 of the trays, while the carrier strips 38 are considerably longer and their protruding ends extend into the ways 36. The carriers are thus inherently slidable longitudinally of the tray.

In common with the orthodox tray of this type, the tray here shown has a front 42, an apron 43 which underlies the first or lowermost card and its carrier leaf, and a front compressor plate 44, which is slidable between the bottom 32 and the apron 43. The rearward edge of the plate 44 engages in the bight formed between the strip 38 and leaf 39 of the first carrier, and serves to hold all of the carriers snugly internested for normal operation. The plate 44 may be released by means of a finger latch 45 at the drawer front, giving room, longitudinally of the drawer, for the carrier strips 38 to be slid out of internesting relationship when certain carriers are to be removed or exchanged.

In accordance with my invention, however, the tray front 42 and the apron, compressor plate, finger latch and associated parts are not permanently mounted in the tray. Instead they are locked in the drawer body in such a way that they may be readily removed as a unit leaving the tray body and its ways 36 forwardly unobstructed to permit the carriers to be slid longitudinally from the tray.

In the specific form here shown, this quick-detachable mounting is effected as follows: at each end of the drawer front an integral extension of the sheet metal stock thereof is directed rearwardly as shown at 46 (Fig. 3) along the inner face of the outer side wall 33 of the tray, then, as indicated at 47, transversely to the outer face of the inner side wall 35 and then forwardly as indicated at 48. The forward end of the portion 48 is of reduced height and doubled upon itself to form a finger engaging portion 49 which protrudes through a short slot 50 in the drawer front. The forwardly directed portion 48 has a laterally upset or struck out portion 51 which has latching engagement with the forward end of a slot 52 in the inner side wall 35 of the tray.

To remove the drawer front, the two protruding finger engaging portions are engaged by the respective thumbs and swung apart, thereby releasing the latching engagement of the portions 51. This permits the drawer front together with its apron, compressor plate, and associated parts to be withdrawn completely from the tray body.

When the drawer front is mounted in the body, the portions 46, 47 and 48 telescope within the hollow of the drawer sides, rigidly mounting the drawer front upon the tray against movement in any direction relative to the tray body. This telescoping engagement also resists any tendency to spread apart the upper edges of the tray sides. For transferring carriers with their cards from one tray to another, the drawer front and its associated parts are removed from the tray, as just described. The cards to be removed from the tray are then slid longitudinally of the tray on to a special or auxiliary transfer tray, according to one form of my invention.

This transfer tray 55 is shown in Fig. 7 brought into longitudinal alignment with the regular tray 30 and with the open front end of the tray 30 brought into register with one end of the transfer tray 55, so that carriers may be slid longitudinally from the tray 30 and on to the transfer tray.

This registering may conveniently be accomplished by forming the transfer tray 55 with the same typical cross section as that of the tray 30. But one end—and preferably both ends—of the transfer tray, while open, are slightly enlarged for a distance of an inch or so to permit telescoping over the open front end of the tray 30. This enlargement of the ends of the transfer tray 55 is indicated at 56 in Figs. 7, 8 and 9. It is preferable, but not essential, that the enlarged end of the transfer tray be, in cross section, co-extensive with the sheet metal of the tray 30 so that it embraces all parts thereof. As shown in Figs. 8 and 9 the latch opening 52 in the inner side wall 35 of the tray may conveniently cooperate with an embossment 57 in the embracing flange of the enlarged end of the transfer tray to resist the transfer tray being pulled out of telescopic register with the tray 30.

As best shown in Fig. 9, the telescopic connection of the regular tray to the transfer tray provides an uninterrupted continuation of the flat surface of the tray bottom 32 and of the ways 36. Carriers, either singly or in groups—or, in fact, a whole trayful of carriers—may be slid inter-tray, that is, from the regular tray to the transfer tray or vice versa, with as much ease as carriers have heretofore been slid intra-tray.

The shifting tray 55 is used as an auxiliary instrumentality in effecting the shifting transfer of carriers and their cards from one regular tray to another. The employment of the auxiliary shifting tray permits of only one end—and preferably the front end—of each regular tray being removable. If, as later disclosed herein as another form of my invention, carriers with their cards are to be shifted directly from one regular tray to another regular tray, without the use of an auxiliary transfer tray, then both ends of the regular tray should be made removable.

In the sequential Figures 10 to 21, inclusive, I have shown a typical operation in inter-tray shifting of cards in accordance with my invention employing the auxiliary shifting tray 55. As an elementary example, suppose that there are in a visible index file, one tray containing the A, B and C cards as shown in Fig. 10, and a second tray containing the D, E and F cards, as shown in Fig. 10a. Suppose 50% more cards are to be added to these in the course of expanding the file. That means that three instead of two trays would have to be employed to hold the A to F cards.

The present practice would be to remove the carriers for the C and D cards from the respective trays by flexing the base strips 38 and putting them into a third or new tray. This requires that the carriers be transferred more or less individually. According to my invention, employing the shifting tray 55, I remove the front from the first tray T—1 and put one end of the transfer tray 55 into register with the open front end of the tray T—1. Then I slide the C cards on to the transfer tray, as shown in Fig. 11. This leaves the tray T—1 containing only the A and B cards, as shown in Fig. 11a, and the transfer tray containing only the C cards, as shown in Fig. 12. Then the transfer tray 55 is turned around and its other end brought into register with the front end of the second tray T—2, from which the front has been removed. All of the cards in the tray T—2 are then shifted as a unit into the transfer tray 55, as shown in Fig. 13. This leaves the tray T—2 empty, as shown in Fig. 14. It leaves the transfer tray holding the C, D, E, and F cards, but with the C and F cards back to back, as shown in Fig. 15. To make this possible the transfer tray is preferably considerably longer than a regular tray—about 50% longer will be satisfactory in most cases.

The transfer tray is again turned around to bring the C cards at the rear end. It is then brought into register with an empty regular tray from which the front has been removed. In Fig. 16 this is shown as being the tray T—2, also it could be any empty regular tray. The C cards are then slid from the transfer tray to the back of the tray T—2, leaving them in the position shown in Fig. 17.

Again the transfer tray 55 is turned around, so that the D, E and F cards read right side up. The transfer tray is then brought in register with the open end of the tray T—2, as shown in Fig. 18, and the D cards are slid into the tray T—2. That leaves the C and D cards in tray T—2, as shown in Fig. 19.

Next another empty regular tray T—3 is brought into register with the same end of the transfer tray, as shown in Fig. 20, and the remaining cards—the E and F cards—are slid from the transfer tray into the tray T—3, leaving the E and F cards in the tray T—3, as shown in Fig. 21.

The removed fronts of the several trays are then replaced. The additional cards and carriers therefor to be added, may be inserted at any stage in this operation. For example, while the tray T—1 and the transfer tray are in the position of Fig. 11, all additions to be made to the A, B and C cards may be effected. That is convenient because there is plenty of longitudinal room for spreading the carriers apart to insert the additional carriers. This is also convenient because it can then be determined accurately how many of the carriers may remain in tray T—1 and how many will have to be transferred to the next tray. If the foregoing plan is followed, the excess cards from the tray T—1 will be in the tray T—2 in Fig. 18 and at that time cards and carriers may be inserted in the D, E and F cards at a stage where there is ample tray length for conveniently spreading apart and inserting carriers.

Or, following a more literal interpretation of the sequential Figures 10 to 21, the insertion of additional cards may be delayed until the original cards and carriers are redistributed between the three trays, according to Figs. 11a, 19 and 21.

Another way of carrying out my invention is to dispense with the use of an auxiliary shifting tray—or at least make its use optional—by shifting carriers directly from one regular tray to another regular tray. This makes it advisable to have both the front and back of each regular tray removable and to form the front end of each tray so that it will telescope with the back end of another tray to hold the two trays in register for inter-tray shifting of carriers. Such a tray is shown in Fig. 22.

The front end of the tray body in the form of Fig. 22 is enlarged to telescope with the end of another tray. The enlargement is much like that disclosed in Figs. 7, 8 and 9 on the end of the transfer tray.

For reasons which will later be apparent, I prefer in this form of tray to use a slightly different latch arrangement for detachably locking the tray front to the tray body. At each end of the drawer front an integral extension of its sheet material is bent to form portions 46', 47' and 48' which enter and telescope with the hollow sides of the tray. The movable latch member, however, is carried by the tray side. Spaced horizontal slits 61 in the outer drawer side 33 define a tongue 33' which carries a struck-out latch member 51'. The latter cooperates with the end wall 52' of an opening in the adjacent portion 46' of the front extension. The forward end of the tongue 33' protrudes beyond the face of the front 42 to constitute a finger piece 49'.

To remove the tray front, its apron, compressor plate and associated parts, the protruding finger pieces 49' are spread apart against the resiliency of their metal to unlatch the front and permit its removal.

A somewhat similar arrangement is used for detachably latching the rear of the tray to the body of the tray.

As shown in Figs. 22, 23 and 24, the tray includes a normally imminent hinged tail piece 62. It is hinged by a pintle 63 to the tray back 42''. At each end the back 42'' carries an integral extension telescoping within the hollow drawer sides and comprising the portions 46'', 47'' and 48'' corresponding to the portions 46', 47' and 48' on the tray front. A tongue 33'' is formed in the outer side wall of the tray body, corresponding to the tongue 33', and has a slot 52'' cooperating with a struck-out portion 51'' on the portion 46'' for detachably latching the tray back to the drawer body.

The tray back 42'' carries with it not only the hinged tail piece 62, but the hinged flap or top sheet 64 and the spring pressed rear compressor 65.

When the back is to be removed, the hinged tail piece 62 is swung down to expose the protruding rear ends 49" of the tongues 33". This enables the operator to spread the finger pieces 49" to unlatch the back. The back is then pulled out from the tray body carrying with it as a unit the tail piece 62, rear compressor 65, its spring mounting support, and the top sheet 64.

To shift card carriers directly from a first tray to a second tray, one end of one tray and the other end of the other tray are removed and their open ends brought into alignment, as indicated by Fig. 25. Then the adjacent ends are telescoped, the rear end of one tray telescoping into the enlarged front end of the other tray. The two trays are releasably held in register by the cooperating latch members 51' and 52". Three or more trays may be set in alignment and register in this manner, but, of course, both ends of intermediate trays have to be removed.

An auxiliary shifting tray may be used in conjunction with trays of the type of Fig. 22 to provide additional length for easy spreading apart of carriers and insertion of new carriers. For that use the shifting tray may be enlarged at one end and not enlarged at the other end. Or two trays may be employed, one of which is enlarged at both ends and the other of which is enlarged at neither end.

For use with an auxiliary shifting tray, and where it is not desired to shift directly from one regular tray to another regular tray, the regular trays may be made with their back ends removable, according to the design of Fig. 22, but with their front ends not enlarged and with their ends removable according to the design of Figs. 2 to 6.

In Figs. 26 and 27 I have shown an alternative expedient for holding the open ends of trays in register. This does not require any end enlargement for telescoping. Instead a coupling sleeve 66 is employed with telescopes over both abutting ends of two trays or of one regular tray and a shifting tray. In cross section the coupling 66 may be a simple channel, but I prefer that it have a cross section similar to and coextensive with that of the trays. Longitudinal separation of the trays may be restrained by a yielding snap connection of the sleeve with each tray end. This is shown in Figs. 26 and 27 by the cooperating embossments 67 and 68.

While I have described these specific embodiments of my invention, I contemplate that many changes and substitutions may be made thereover without departing from the scope or spirit of my invention.

I claim:

1. The combination with a plurality of visible index trays having opposed lateral ways for slidably receiving the ends of card holders which pivotally mount cards to lie in normally overlapping relationship with their margins exposed, at least one of the trays being constructed and arranged to be received drawer-wise in a cabinet and having a quick-removable front with a drawer pull handle, means for temporarily holding the trays—when longitudinally aligned with said front removed—with their ends juxtaposed and in register to present continuous ways for sliding the card holders in groups from one tray to the other.

2. The combination with a plurality of visible index trays having opposed lateral ways for slidably receiving the ends of card holders which pivotally mount cards to lie in normally overlapping relationship with their margins exposed, at least one of the trays being constructed and arranged to be received drawer-wise in a cabinet and having an imminent hinged tail member and a drawer front member, means for temporarily holding the trays—when longitudinally aligned—with their adjacent members removed with their ends juxtaposed and in register to present continuous ways for sliding the card holders in groups from one tray to the other, and means for detachably securing one of the members in its tray for normal use of the tray to keep card carriers from moving off the end thereof.

3. In a visible index system, the combination with a plurality of regular trays slidably received and stored in a common cabinet, each of which trays has opposed longitudinally extending inwardly facing channel ways at their lateral edges for receiving—for slidable movement longitudinally of the tray—the respective ends of a multiplicity of card holders which hingedly carry record cards in normally overlapping position with their margins exposed, and each of which trays has a front and a back end member one of which members is quickly removable for restraining the holders from passing off the respective ends of the tray,—of means for transferring cards between the regular trays comprising, an auxiliary transfer tray also having laterally extending ways for slidably receiving the respective ends of the card holders, and coupling means for holding an end of the shifting tray in register with the end of one of the regular trays—from which the end member has been removed—to provide continuous ways for the sliding of holders, together with their cards, en masse between the regular tray and the transfer tray.

GEORGE C. BRUEN.